March 6, 1951 V. E. MATULAITIS 2,544,465
AIR DISTRIBUTING DUCT
Filed Oct. 2, 1947 2 Sheets-Sheet 1
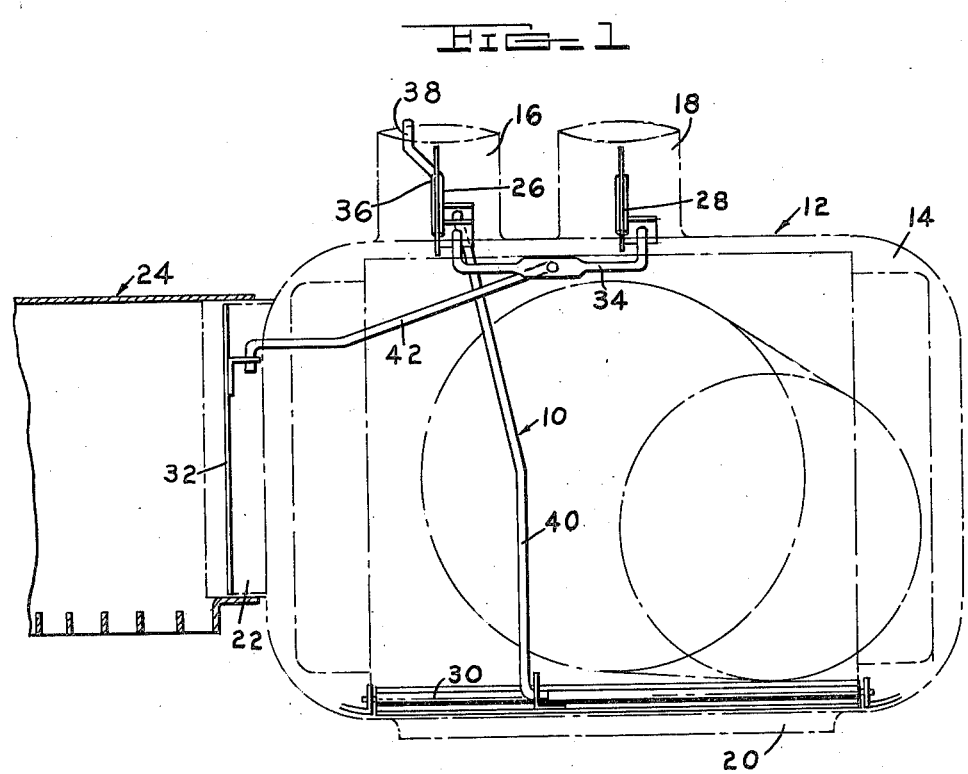
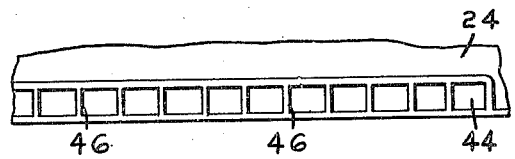
INVENTOR.
VICTOR E. MATULAITIS
BY
McDonald & Feagus
ATTORNEYS March 6, 1951  V. E. MATULAITIS  2,544,465
AIR DISTRIBUTING DUCT
Filed Oct. 2, 1947  2 Sheets-Sheet 2
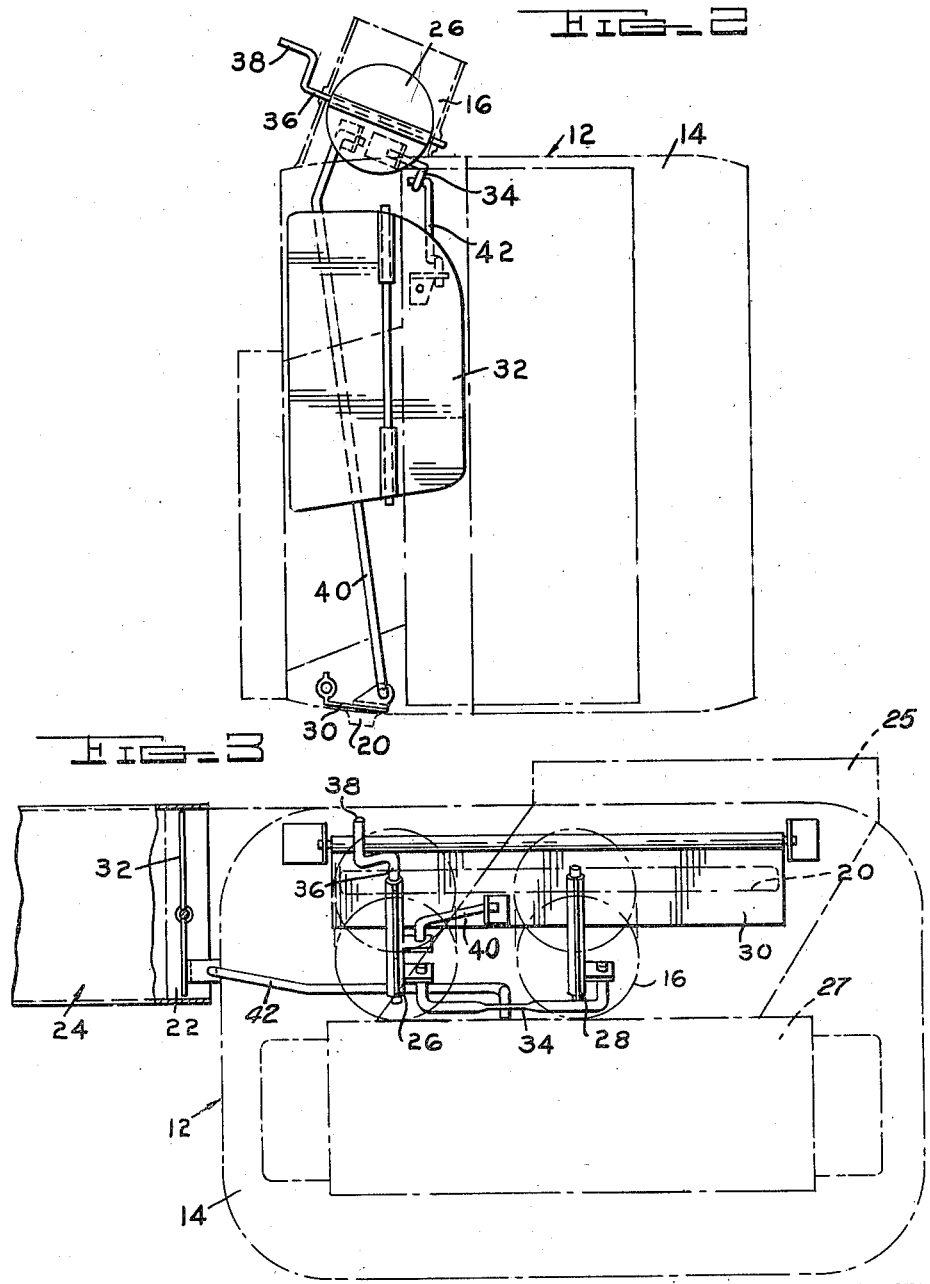
INVENTOR.
VICTOR E. MATULAITIS
BY
ATTORNEYS Patented Mar. 6, 1951

2,544,465

UNITED STATES PATENT OFFICE 2,544,465

AIR DISTRIBUTING DUCT

Victor E. Matulaitis, Detroit, Mich., assignor to Eaton Manufacturing Company, Cleveland, Ohio, a corporation of Ohio Application October 2, 1947, Serial No. 777,508

4 Claims. (Cl. 98—2)

This invention relates to heaters and more particularly to mechanism for controlling the air distribution therefrom.

Broadly the invention comprehends the provision of manually operated mechanism for controlling the distribution of air delivered by a heater of the automotive vehicle type for the desired quantity of air flow for either windshield defrosting or passage compartment heating or air circulation cooling.

An object of the invention is the provision of suitably controlled air distributing mechanism for vehicle heaters and the like for the proper effective distribution of air to desired points in required quantities.

Another object of the invention is the provision of a manually operated control mechanism associated with air distributing means of an automotive vehicle heater or the like effective through the manipulation of one member to properly proportion the quantity of air flow through a plurality of air delivery discharge members.

A further object of the invention is the provision of air distributing means associated with an automotive vehicle fresh air heater or air circulator having manually operated shutter mechanism for controlling the air discharge from the heater for delivery to the windshield and a plurality of passenger compartment locations, effective to proportion the flow from the several discharge openings in accordance with the amount desired.

Other objects and advantages of the invention will appear from the following description taken in connection with the drawings, forming a part of the specification; and in which:

Fig. 1 is a face plan view of air distributor control mechanism as associated with a heater mechanism and vehicle compartment air distribution duct shown in fragmentary section;

Fig. 2 is a side plan view of Fig. 1 looking from the air distribution duct end thereof;

Fig. 3 is a top plan of Fig. 1; and,

Fig. 4 is a fragmentary bottom plan view of the air distribution duct of Figs. 1 and 3.

It has become vitally necessary in the production of presently developed space heaters for the passenger compartments of automotive vehicles to provide means for effectively distributing the air delivered thereby and for controlling the quantity of air distributed to a plurality of predetermined locations. The present invention was devised for the purpose of effectively controlling the air delivered by a space heater for automotive vehicles wherein it is desired to effect a proper and ample distribution of air to the passenger compartment of an associated vehicle and windshield thereof in controlled quantity. Through the provision of a novel interconnected arrangement of shutter mechanisms incorporated in a heater air outlet housing having a plurality of appropriate air discharge openings, strategically located for the effective distribution of air in the passenger compartment, it is possible through the manipulation of a single control to set the shutters to desired position for the controlled discharge of air in proportion to the amount it is desired to deliver to any of the openings in predetermined proportion in accordance with the interrelated setting of the shutter mechanisms.

Referring to the drawings for more specific details of the invention 10 represents generally an air distribution controlling shutter mechanism incorporated in an automotive vehicle space heater 12.

The heater 12 as shown by Figs. 1 through 3 comprises a heater housing 14 having appropriate windshield defroster discharge tubes 16 and 18, passenger compartment floor directed outlet 20, and a side outlet 22 associated with an air distributing duct 24 adapted to be arranged upon the dashboard of a vehicle within the passenger compartment extending substantially across the full width of the vehicle compartment with the heater housing as a part thereof. The heater 12 is of the type more specifically disclosed by my copending application Serial No. 777,507, filed October 2, 1947, wherein 25 defines the air inlet opening to the heater core 27.

The mechanism 10 comprises air flow control shutters 26 and 28 associated respectively with the discharge tubes 16 and 18, an air flow control shutter 30 associated with outlet 20 and an air flow control shutter 32 associated with the outlet 22. The shutters 26 and 28 are each pivoted in the tubes 16 and 18 and are joined together by a cross bar link 34 pivotally secured at the ends thereof to each of the shutters. The pivot axis 36 of the shutter 26 has a crank extension 38 adapted to be connected with manual control mechanism not shown, suitably adapted to be conveniently located in the passenger compartment for easy manipulation.

The shutter 30 is pivoted internally of the housing 14 and is adapted to completely cover the opening of the outlet 20 from inside the housing, said shutter 30 being pivotally connected to shutter 26 by a link 40 arranged therebetween.

The shutter 32 is pivotally arranged internally of the outlet 22 for controlling flow of air from the heater housing into the air distribution duct 24 and is joined to the cross bar link intermediate thereof for movement therewith by a link 42 loosely pivoted at its ends.

The mechanism 10 as shown by the drawings is arranged for maximum air flow through the tubes 16 and 18 while at the same time the air flow through outlets 20 and 22 is controlled to a minimum.

The links 34, 40, and 42 are so arranged relative to each other and the predetermined setting of the shutters 26, 28, 30, and 32 relative to one another so that any movement of the crank extension 38 effective to rotate the pivot axis 36 of the shutter 26 causes a concurrent motion of the links resulting in pivoting the shutters proportionately therewith such that as the shutters 26 and 28 operating similarly to one another are moved to closed position the shutters 30 and 32 are moved toward full open position thereby effecting a desired distribution of air flow in accordance with requirements.

The air distribution duct 24 is provided with an opening 44 arranged across the bottom thereof with air directing vanes 46 therein for properly directing the air toward the floor of the vehicle.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An air distributor for a vehicle heater comprising a casing having an air inlet opening, a pair of windshield defroster air outlet openings, and two air outlet openings arranged perpendicularly to one another, an air flow control valve for each of the defroster air outlet openings and air outlet openings, means interconnecting the control valves for the defroster outlet openings for identical air flow control and movement thereby, means coupling the interconnecting means of the defroster outlet control valves to the control valve for one of the air outlet openings and means coupling one of the defroster outlet control valves to the control valve for the other air outlet opening, said means being arranged for the pre-arranged setting of all the control valves and effective to provide for the predetermined proportionate movement of the valves relative to one another and said valves being each arranged on different sides of the casing, the valve next adjacent being perpendicularly arranged thereto when in closed position.

2. A vehicle heater air distributor comprising a casing having an air inlet opening, a pair of windshield defroster air outlet openings, and two other air outlet openings disposed in the casing at right angles to one another, a heater core disposed substantially centrally within the casing, a pair of similar valves one for each of the defroster air outlet openings, means interconnecting the valves, an air control valve for each of the other outlet openings, a link extending from the interconnection of the defroster valves to one of the other valves, and another link extending transversely of the first link interconnecting the defroster valves to the other valve.

3. An air distributor for vehicle heaters comprising a casing having an air inlet through one face thereof, and a plurality of air outlet openings disposed on three sides of the casing comprising a pair of side by side windshield defroster air outlet openings, an opening on the opposite side from the defroster openings, and an opening on the side of the casing between the sides of the other openings, a pair of similar defroster valves, one for each of the defroster openings, a link interconnecting the defroster valves, a lever connected to one of the defroster valves, a valve for controlling the opening opposite from the defroster openings, a valve for controlling the other opening, a link extending within the casing connecting the interconnecting link between the defroster valves with the valve for the opening adjacent the side in which the defroster openings are located, and a link extending transversely of the last aforementioned link connecting one of the defroster valves with the valve for the opening in the side opposite the side in which the defroster openings are located.

4. An air distributor for a vehicle heater comprising a casing having an air inlet opening through a face thereof, a pair of windshield defroster air outlet openings in one side wall thereof, an air outlet opening in a side wall thereof adjacent the defroster air outlet opening wall, and an air outlet opening in a wall oppositely disposed from the wall having the defroster outlet openings therein, a heater core disposed within the casing associated with the inlet and outlet openings thereof, a valve for each of the defroster outlet openings, a link disposed within the casing interconnecting said valves extending substantially parallel to the wall having the defroster outlet openings therein, a valve for the openings in the wall adjacent the wall having the defroster outlet openings, a link extending in the casing interconnecting the valves for the defroster openings and openings in the adjacent wall together, and another link extending in the casing substantially perpendicular to the interconnecting link for the defroster valves connecting one of the defroster valves to the valve for the opening in the wall opposite from the wall having the defroster openings therein.

VICTOR E. MATULAITIS.

REFERENCES CITED

The following references are of record in the file of this patent:

UNITED STATES PATENTS

| Number | Name | Date |
|---|---|---|
| 2,164,057 | Fink | June 27, 1939 |
| 2,225,071 | Meyerhoefer | Dec. 17, 1940 |
| 2,304,643 | Hans | Dec. 8, 1942 |
| 2,373,496 | Paiste, Jr. | Apr. 10, 1945 |
| 2,488,278 | Findley | Nov. 15, 1949 |